(12) United States Patent
Palin (10) Patent No.: US 6,421,401 B1
(45) Date of Patent: Jul. 16, 2002

(54) METHOD AND APPARATUS FOR ACHIEVING AND MAINTAINING SYMBOL SYNCHRONIZATION PARTICULARLY IN AN OFDM SYSTEM

(75) Inventor: Arto Palin, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/307,642

(22) Filed: May 7, 1999

(30) Foreign Application Priority Data

May 7, 1998 (FI) .................................................. 981015

(51) Int. Cl.[7] ............................. H03D 1/00; H04L 27/06
(52) U.S. Cl. ........................................ 375/343; 375/354
(58) Field of Search ................................. 375/343, 355, 375/357, 142, 150; 370/350, 516, 517

(56) References Cited

U.S. PATENT DOCUMENTS 5,991,289 A * 11/1999 Huang et al. ............... 370/350

FOREIGN PATENT DOCUMENTS

| EP | 0653858 | 5/1995 |
|----|---------|--------|
| EP | 0730357 | 9/1996 |
| EP | 0772332 | 5/1997 |
| EP | 0825742 | 2/1998 |
| WO | 9602991 | 2/1996 |
| WO | 9719542 | 5/1997 |
| WO | 9726742 | 7/1997 |
| WO | 9810547 | 3/1998 |

OTHER PUBLICATIONS

"Improved Symbol Synchronization Method in OFDM Syster in Channels with Large Delay Spreads" by A. Palin et al. Proceedings of First International Symposium on Communication Systems and Digital Signal Processing, 1998, pp. 309–312.

"Low–Complex Frame Synchronization in OFDM Systems" by van de Beek et al. Div. of Signal Processing, Lulea University of Technology, Sweden. IEEE Apr. 1995, pp. 982–986.

* cited by examiner

Primary Examiner—Mohammad H. Ghayour
(74) Attorney, Agent, or Firm—Ware, Fressola, Van Der Sluys & Adolphson LLP (57) ABSTRACT

To achieve and maintain symbol synchronization in a receiver a correlation (302) between an undelayed sequence of samples representing the received signal and a delayed sequence of samples representing the received signal is calculated, and a moving sum (306) of the calculated correlation to produce a certain sequence of values is calculated. In addition, the values in the sequence of values are multiplied by predetermined other values obtained from the sequence of values in order to produce (307, 502) a modified sequence of values, and a moving sum (311, 505) is calculated of the modified sequence of values to produce a peak value that indicates the correct symbol synchronization.

12 Claims, 4 Drawing Sheets

METHOD AND APPARATUS FOR ACHIEVING AND MAINTAINING SYMBOL SYNCHRONIZATION PARTICULARLY IN AN OFDM SYSTEM

TECHNICAL FIELD

The invention relates in general to the synchronization of a radio receiver to a received signal. In particular the invention relates to the realization of symbol synchronization in a system wherein the received signal contains a certain guard interval the timing of which has to be right in the reception, so that potential multi-path components in the received signal can be utilized in an optimal manner.

BACKGROUND OF THE INVENTION

Abbreviation OFDM (Orthogonal Frequency Division Multiplex) refers to a modulation method in which the transmitting apparatus divides and combines the transmitted signal into several subcarriers which are located on the frequency axis at regular intervals on a certain frequency band and which are sent simultaneously. Known radio-frequency communications systems that employ OFDM modulation include the DAB (Digital Audio Broadcasting) and DVB (Digital Video Broadcasting) systems. The former is specified in general outline in the standards drawn up by the European Broadcasting Union (EBU) and the European Telecommunications Standards Institute (ETSI), and the latter is specified in general outline in a draft standard by the same organizations. In these systems, a section of a digital signal to be transmitted on a certain subcarrier is encoded into phase and/or amplitude changes with respect to a certain known phase. That time slice of the transmitted signal during which the modulating phase state is constant separately at each subcarrier frequency is called an OFDM symbol, or a symbol in short.

Successful OFDM reception requires that the receiver maintains the correct symbol synchronization and sampling frequency. Symbol synchronization means that the receiver knows at which point in time each symbol begins and times the symbol detection correspondingly. Sampling frequency refers here to the frequency at which the A/D converter in the receiver takes samples from the received analog oscillation in order to convert the signal into digital form, whereby the A/D converter and subsequent circuits can interpret to which bits or bit combinations in the digital data flow the signal phase changes refer. In addition, the receiver has to maintain frequency synchronization, i.e. tune the reception and mixing circuits so that the detected frequency band covers all subcarriers of the OFDM signal at an accuracy which is less than half of the difference between two adjacent subcarriers. Maintaining the symbol synchronization, sampling frequency and frequency synchronization is especially difficult if the transmitter and receiver are moving with respect to each other. The receiver may be located in a car, for example, and as the car moves around in an urban environment, the propagation path of the radio signal changes constantly, resulting in attenuation and reflections. The receiver may also be located in a satellite, and as the satellite moves, the speed difference between the receiver and the satellite changes, being possibly up to several kilometres per second. This patent application is especially concerned with achieving and maintaining symbol synchronization.

An adjustment method for symbol synchronization and sampling frequency in an apparatus receiving OFDM-modulated transmissions as well as an apparatus realizing such a method is known from Finnish patent application Ser. No. 963649. The method disclosed is based on utilizing time-domain correlation characteristics of the reference signal in an OFDM transmission. In the DAB system, the reference signal means a phase reference symbol, and cross-correlation between the received format and the known format of that symbol yields the instantaneous impulse response. In the DVB system, the impulse response is estimated from scattered pilot subcarriers for four consecutive symbols. The required changes in the symbol synchronization and sampling frequency can be deduced by monitoring how the impulse response changes from one measurement to another. The symbol synchronization is preferably set such that the guard interval between the symbols coincides with the beginning of the correlation function representing the impulse response. A sampling frequency error shows between the measurements as a slow and monotonously continuous shift of the maximum of the correlation function representing the impulse response. By correcting the sampling frequency the receiver attempts to eliminate said change.

Figure 1:
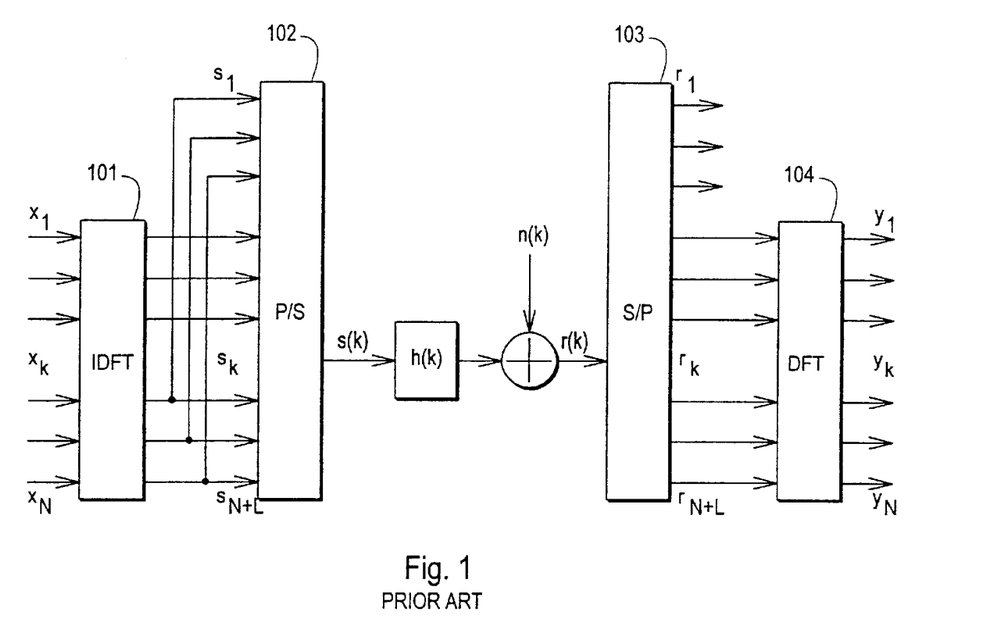
FIG. 1 shows a known OFDM system model.

From publication "Low-Complex Frame Synchronization in OFDM Systems" by J-J. van de Beek, M. Sandell, M. Isaksson, P.O. Börjesson, IEEE International Conference on Universal Personal Communications, Tokyo 1995, a method for achieving symbol synchronization by utilizing characteristics of data transmitted in an OFDM system is known. This method is briefly explained below. FIG. 1 shows a simple OFDM system model wherein complex numbers $X_k$, $k\epsilon[1,N]$ taken from a fundamental set, or constellation, are to be transmitted (cf. allowed points in phase-amplitude coordinate system in quadrature amplitude modulation, QAM). The complex numbers $x_k$ are used for modulating N subcarriers by means of an inverse discrete Fourier transform (IDFT) in block 101. The result is N samples s, the last L of which are copied to the beginning of the sample set. After the copying, the number of samples is N+L and a given sample can be marked $s_k$, where $k\epsilon[1,N+L]$. The samples copied to the beginning of the sample set constitute a so-called guard interval because in time domain they appear as a period in the beginning of the symbol the contents of which are a copy of the end of the symbol.

A parallel-to-serial converter 102 is used to generate an OFDM symbol, marked s(k). When traveling from the transmitter to a receiver through a given channel the symbol s(k) is affected by the impulse response h(k) of the channel and noise n(k) is added to it. The receiver sees the received sample sequence, marked r(k). The latter undergoes a serial-to-parallel conversion in block 103 producing samples $r_k$, where still $k\epsilon[1,N+L]$. Only the last N samples are independent of each other, so they are taken to block 104 where a discrete Fourier transform takes place. Symbol synchronization is the same as determining out from which location in the received sample sequence said last N samples will be taken. The end result are complex numbers $y_k$, $k\epsilon[1,N]$. If reception was fully successful, those complex numbers are the same as the transmitted complex numbers $x_k$.

Figure 2:
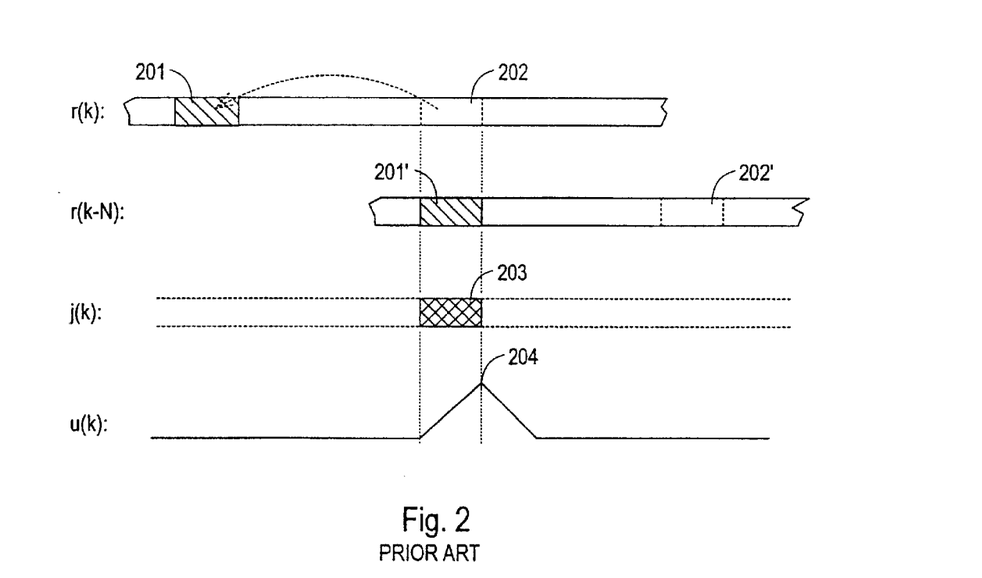
FIG. 2 shows a known arrangement for calculating simple correlation.

In said method, a copy r(k−N) is made of the received symbol r(k) and said copy is delayed by N samples with respect to the original received symbol. A correlation function is defined between the copy and the original:

$$j(k)=r(k)r^*(k-N) \quad (1)$$

where * stands for complex conjugation. Then we can calculate the moving sum using a window of L samples $$u(k) = \sum_{i=0}^{L-1} j(k-1) \quad (2)$$

and sliding the window over the received sample sequence for the length of 2N+L samples. FIG. 2 shows a received sample sequence r(k) with a guard interval 201 for a symbol and the corresponding period 202 at the end of the symbol, a copy r(k–N) of the received sample sequence, sequence portions 201' and 202' corresponding to the guard interval 201 and original samples 202, and a correlation result j(k) with a period 203 that represents high correlation. In addition, FIG. 2 shows the value of the moving sum u(k) in such a way that the value on the u(k) curve corresponds to the sum according to equation 2 in that window the right edge of which coincides with the value in question. The figure shows that the u(k) curve has a distinct correlation peak 204 the top of which coincides with the end of a given symbol in the original sample sequence. In said method according to the prior art symbol synchronization is based on the detection of the top of the correlation peak 204.

The methods according to the prior art described above are applicable in cases where the signal's delay spread is small, i.e. all significant components of the signal caused by multipath propagation are located relatively close to each other in time. From prior art an efficient method to maintain symbol synchronization in an OFDM receiver when the delay spread is large is not known.

SUMMARY OF THE INVENTION

An object of this invention is to provide a method and apparatus for achieving and maintaining symbol synchronization in an apparatus receiving OFDM-modulated transmissions. It is particularly an object of the invention that the method according to the invention does not require unreasonable computing capacity nor hard-to-manufacture special components, and that the apparatus realizing the method be suitable to large-scale series production as regards its manufacturing costs.

The objects of the invention are achieved by computing in the receiver a correlation between two mutually delayed sample sequences and, after that, a correlation between two correlation results computed that way.

The invention is directed to a method for achieving and maintaining symbol synchronization in a receiver, comprising steps in which the correlation between an undelayed sample sequence representing a received signal and a delayed sample sequence representing a received signal is calculated, and a moving sum is calculated of the calculated correlation to produce a sequence of values. In addition, the invention is directed to a receiver apparatus for realizing said method.

The method according to the invention is characterized in that it comprises steps in which values in said value sequence are multiplied by predetermined other values obtained from said value sequence in order to produce a modified sequence of values, and a moving sum is calculated of the modified sequence of values in order to produce a peak value that indicates the correct symbol synchronization.

The receiver according to the invention is characterized in that it comprises means to multiply values in said value sequence by predetermined other values obtained from said value sequence in order to produce a modified sequence of values, and to calculate a moving sum of the modified sequence of values in order to produce a peak value that indicates the correct symbol synchronization.

The weaknesses of the methods according to the prior art become apparent especially when noise is strong (signal-to-noise ratio is poor) and/or multipath propagation causes the channel impulse response to become distributed over a time period comparable to the length of the guard interval. Due to the noise, a correlation peak calculated according to the prior art will not be distinct and the multipath propagation may result in several correlation results from among which it is hard for the receiver to choose the correct timing point. The double correlation according to the invention firstly reduces the effect of noise on correlation peaks. Secondly, the method according to the invention can affect symbol synchronization so that most of the power of the impulse response is within the guard interval timed according to the invention, so that the receiver has the best chances to utilize the energy of the strongest multipath components.

In the method according to the invention a correlation and moving sum between the original sample sequence and a sample sequence that has been delayed for a number of samples equalling the length of the information contents proper is calculated in a known manner. Then a correlation and absolute value of the moving sum between the correlation result thus obtained and a correlation result delayed for a number of samples equalling the length of the whole symbol is calculated. The latter correlation calculation yields a correlation peak indicating the point where most of the channel impulse response power is within the summing window used in the calculation of the moving sum. That correlation peak is used to achieve and maintain symbol synchronization.

The method according to the invention can be complemented by a procedure that compensates for a frequency error caused by a non-ideally set Fourier transform window. This is accomplished using a complex multiplier that equalizes the frequency errors of all symbols so that the constant frequency error can be compensated for using known channel equalization.

BRIEF DESCRIPTION OF THE DRAWINGS

The invention will now be described in more detail with reference to the preferred embodiments presented by way of example and to the accompanying drawing where.

BEST MODE FOR CARRYING OUT THE INVENTION

Above in conjunction with the description of the prior art reference was made to FIGS. 1 and 2, so below in the description of the invention and its preferred embodiments reference will be made mainly to FIGS. 3 through 6b. Like elements in the Figures are denoted by like reference designators.

The invention is based on the method discussed above in the description of the prior art where a copy r(k−N) is made of a received symbol r(k), said copy being delayed for N samples with respect to the original received symbol. Constant N equals the number of subcarriers in the system and also the length in samples of the symbol's information portion proper. A correlation function according to equation (1) is defined between the copy and the original so that it is possible to calculate a moving sum according to equation (2) by sliding a window the length of which is L samples over the received sequence of samples for the length of 2N+L samples. So, constant L equals the length in samples of the symbol's guard interval and sum N+L equals the length in samples of the whole symbol.

In accordance with the first embodiment of the invention, a second correlation and moving sum are calculated wherein each individual value can be determined using the equation $$t(k) = \left| \sum_{i=0}^{L-1} u(k-i)u*(k-i-N-L) \right|. \quad (3)$$

Calculating a moving sum means that the value according to equation (3) is calculated separately for each index k value. In addition, equation (3) takes into account the absolute value of the moving sum, thus achieving independence of the frequency in the sampled signal. If the channel through which the signal travels from the transmitter to the receiver were ideal, calculation of the moving sum according to equation (3) would yield a correlation peak similar to the peak 204 in FIG. 2, even though somewhat more rounded, because the second moving sum operation causes a certain amount of low-pass filtering. In practice, the channel produces multipath components, i.e. several echoes of the same signal arriving at the receiver with different delays. Multipath components cause in the correlation result calculated according to equations (1) and (2) to have several peaks some of which may be located so close to each other that they are perceived in the correlation result as one wide peak. The highest value of the second correlation result calculated according to equation (3) indicates the point where the greatest possible portion of the signal power represented by the various multipath components hits one and the same summing window. Symbol synchronization is preferably set such that the highest value of the second correlation result is set to correspond to the middle point of the guard interval of the received symbol (and not to the beginning of the symbol, as in the arrangement according to FIG. 2). In this way, the best possible use can be made of the guard interval.

In the method according to the first embodiment of the invention, the highest value of the second correlation result is weighted slightly from the middle point of the impulse response toward that direction which has the multipath component with the highest power. In some situations this may prevent that the guard interval from being fully utilized because the highest value of the second correlation result does not necessarily correspond to the middle point of the impulse response. On the other hand, in the method according to the invention the position on the delay scale of echoes that have been considerably attenuated and/or delayed does not significantly affect symbol synchronization. This is advantageous when the echoes do not cause significant inter-symbol effect.

Figure 3:
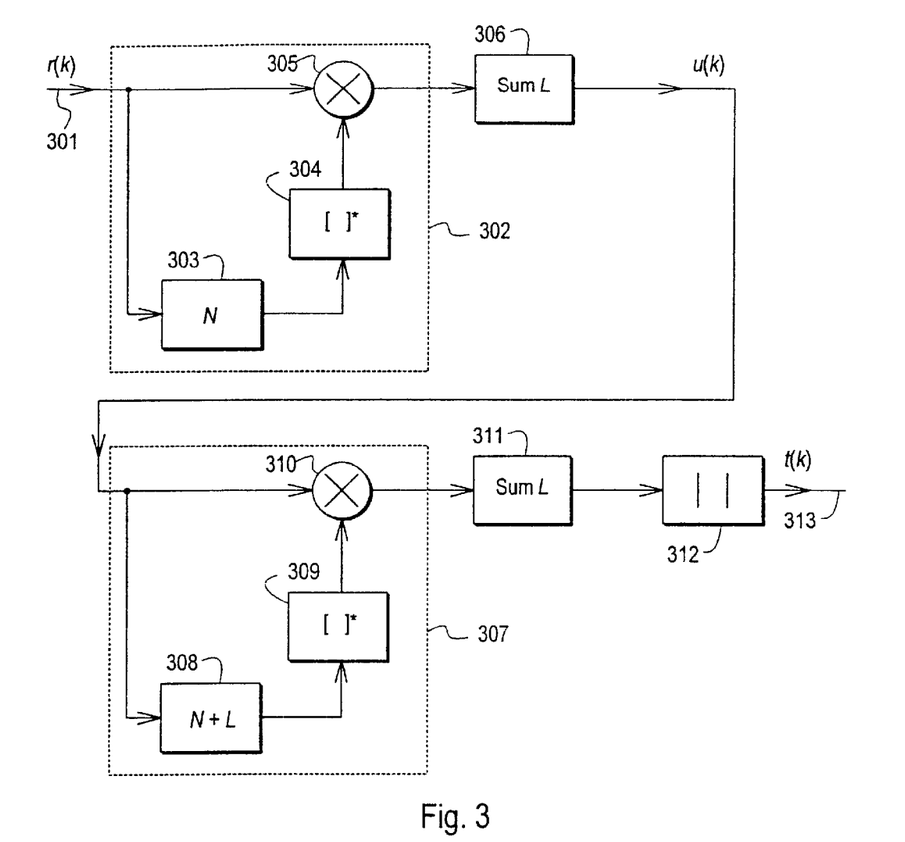
FIG. 3 shows an embodiment of the invention.

FIG. 3 shows an arrangement for practical realization of the first embodiment of the invention. A received sequence of samples r(k) is taken via a line 301 to a first correlator 302, which includes a delay element 303 delaying by N samples, a complex conjugation block 304, and a multiplier 305 arranged such that there is a connection from the line 301 to the multiplier 305 both directly and via the delay element 303 and complex conjugation block 304. The output of the multiplier 305 is also the output of the whole first correlator 302, and it is connected to a moving sum calculation block 306. Blocks 302 to 306 correspond to the prior-art arrangement according to FIG. 2 to produce a correlation result u(k) according to equation (2). The output of block 306 is connected to the input of the second correlator 307. In this embodiment the construction of the second correlator 307 is otherwise similar to that of the first correlator 302 except that the delay element 308 generates a delay of N+L samples. A complex conjugation block 309 and multiplier 310 and the connections between the blocks are similar to those in the first correlator 302. The output of the second correlator 307 is connected to a moving sum calculation block 311, corresponding to block 306. Its output is connected to an absolute value calculation block 312 the output of which is also the output 313 of the whole arrangement.

The arrangement according to FIG. 3 functions as follows. A sample sequence taken through line 301 is branched both directly to the multiplier 305 and to the delay element 303 and complex conjugation block 304 so that in the multiplier 305 a given sample is always multiplied by the complex conjugate of a sample that was located N samples earlier in the sample sequence. Of the results yielded by the multiplier 305 the last L are always added up in block 306. The result u(k) thus obtained is a sequence of values which are taken to a second correlator 307. There, in multiplier 310, a given value in the value sequence u(k) is always multiplied by the complex conjugate of the value located N+L values earlier in the value sequence. Of the results yielded by the multiplier 310 the last L are always added up in block 311 and an absolute value of the result thus obtained is produced in block 312.

The arrangement according to FIG. 3 can be easily complemented by an arrangement for compensating for a frequency error caused by a non-ideally set fast Fourier transform window. A fast Fourier transform (FFT) window refers to the limits specifying which of the received samples belonging to a given symbol are taken to the block (block 104 in FIG. 1) carrying out the discrete Fourier transform in the receiver. The received and demodulated signal can be written $$\hat{X}(k) = X(k)e^{i2\pi k\epsilon/N} \quad (4)$$

where X(k) is the error-free form of the received demodulated signal and $e^{i2\pi k\epsilon/N}$ is an error term where variable $\epsilon$ indicates the magnitude of the error. The value of variable $\epsilon$ is determined as follows; when the position, with respect to the sample sequence, of the FFT window used for demodulating the first symbol in a given frame is known, the position, with respect to the sample sequence, of the FFT window used for demodulating the next symbol is calculated, so that the difference between the positions of these two FFT windows indicates the value of variable $\epsilon$ to be used in the demodulation equalization of the symbol in question.

Figure 4:
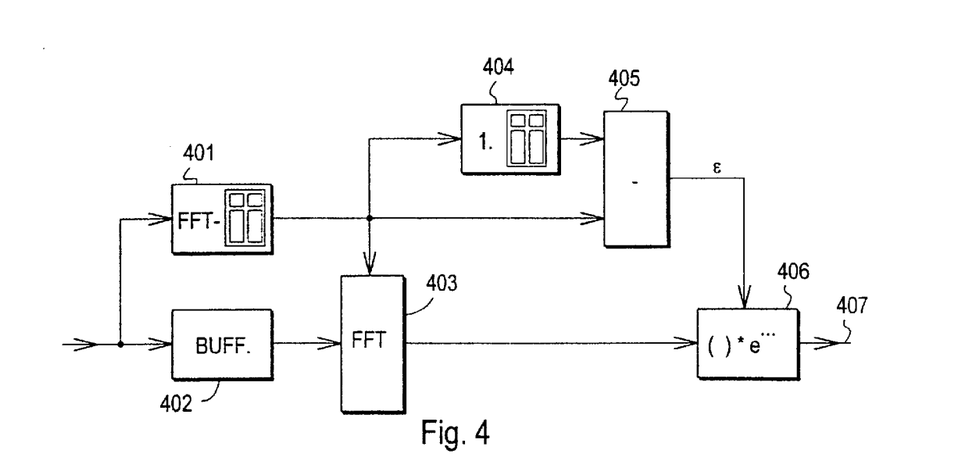
FIG. 4 shows an arrangement with frequency error compensation.

FIG. 4 shows a combined arrangement where block 401 comprises the arrangement according to FIG. 3 and in addition known means for finding the highest value of the result (the result from block 312 in FIG. 3) obtained by double correlation, and for setting the position of the FFT window such that the FFT window starts L/2 samples after the highest value found—this way the highest value found will be in the middle of the guard interval. A buffer 402 delays the received sample sequence such that there is time to carry out the calculations in block 401 and take the FFT window position information from block 401 to block 403, whereafter samples according to the FFT window are separated from the received samples and a discrete Fourier transform is performed on them in block 403. On the basis of information obtained from block 403, blocks 404 and 405 carry out the necessary calculations to determine the value of variable $\epsilon$, after which the frequency error compensation can be performed in block 406 on the signal demodulated by the Fourier transform by multiplying it by $e^{-i2\pi k\epsilon/N}$. The frequency error is compensated for in such a manner that the frequency errors of all symbols in the frame are equalized so that the constant frequency error can be compensated for by known channel equalization connected to output 407.

Figure 5:
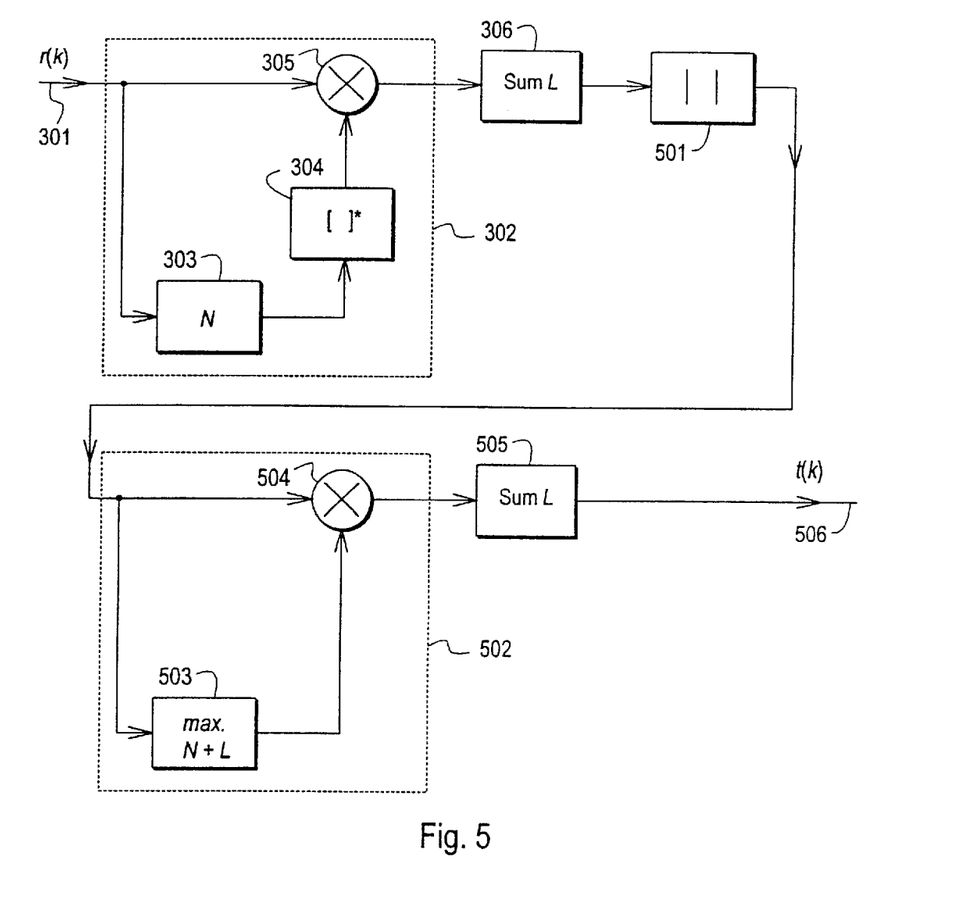
FIG. 5 shows a second embodiment of the invention.

Modifications may be made on the arrangement depicted in FIG. 3 without departing from the scope of the inventional idea. One modification is shown in FIG. 5. Depicted are a first correlator 302 and, following it, a moving sum calculation block 306, which are similar to those described above. Connected to the output of block 306 is an absolute value calculation block 501 to calculate the absolute values of the correlation results produced by block 306. A second correlator 502 in the embodiment according to FIG. 5 does not calculate the correlation proper between two consecutive correlation results, as in the arrangement depicted in FIG. 3, but block 503 includes means for finding the highest value among those produced by block 501 as well as means for multiplying in block 504 the value sequence brought to block 503 by the highest value found. After that, a moving sum the length of which equals the value of L is again calculated in block 505 and taken to output 506.

Figure 6A:
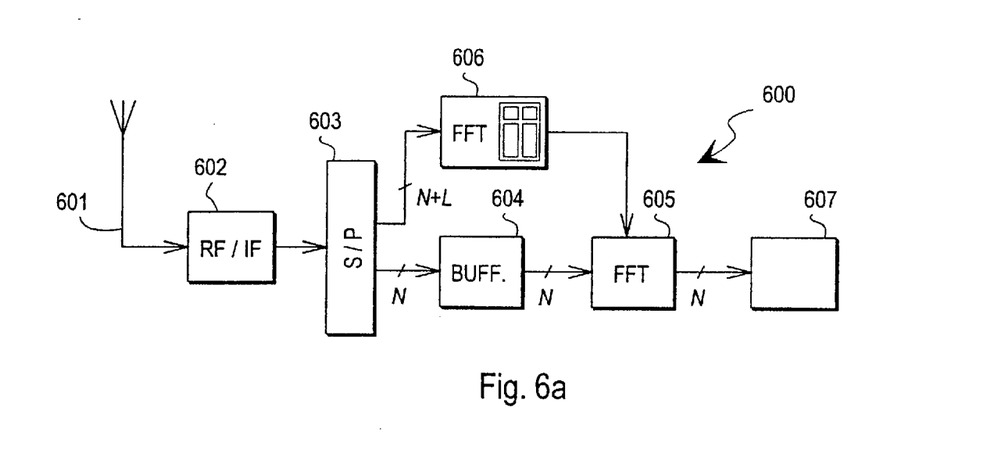
FIG. 6a shows an embodiment of the invention placed in a receiver.
Figure 6B:
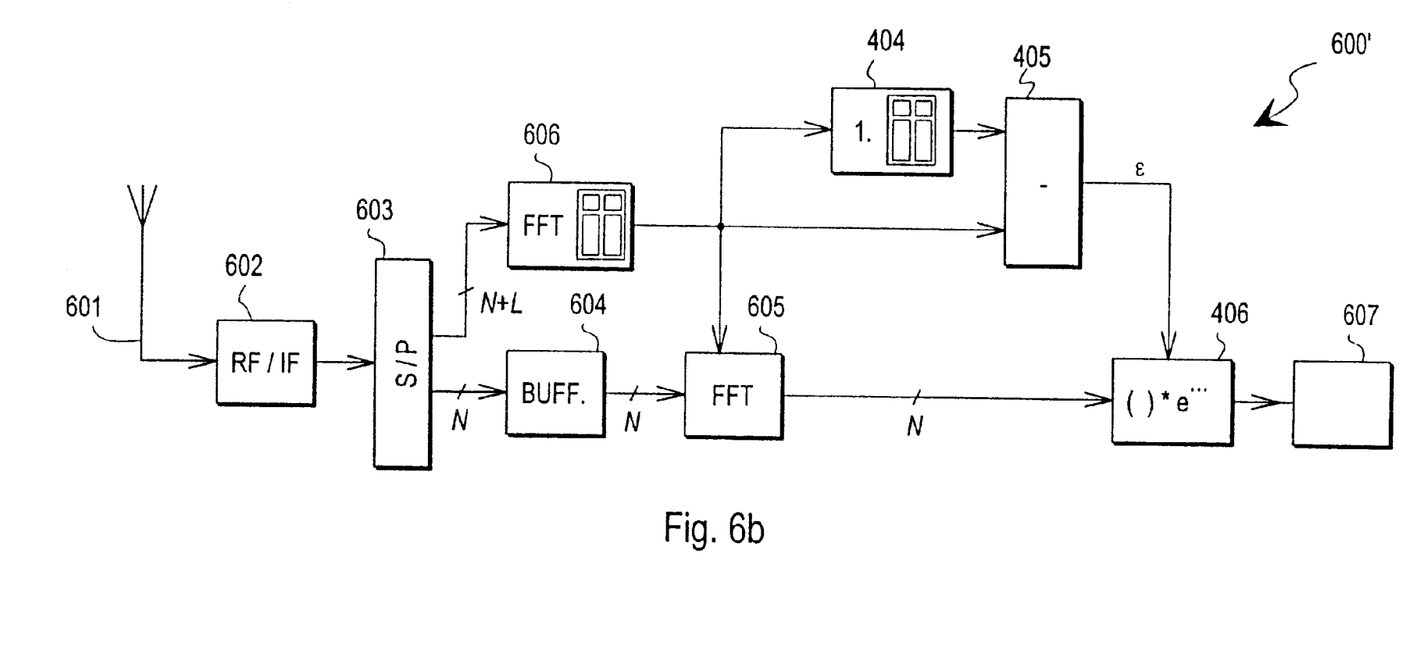
FIG. 6b shows a second embodiment of the invention placed in a receiver.

FIG. 6a shows the arrangement according to FIG. 3 or FIG. 5 in a receiver 600 which comprises an antenna (or other reception interface) 601 and a radio and intermediate frequency block 602 for mixing a received signal via an intermediate frequency to baseband frequency for demodulation. A parallel/serial converter 603 corresponds to block 103 in FIG. 1, followed by a buffer 604 and FFT block 605 and in parallel with those, the arrangement 606 according to the invention for achieving and maintaining symbol synchronization. Blocks 604, 605 and 606 are identical to blocks 402, 403 and 401 in FIG. 4 as regards their operation and mutual connections. The demodulated signal is taken from block 605 to a baseband part 607 for decoding and reproduction of the transmitted signal (such as combined audio and data signal transmitted in DAB format). Block 607 may include e.g. a loudspeaker to play back sound to the user and a control circuit to process the data portion included in the received signal. The arrangement shown in FIG. 6b is otherwise the same as in FIG. 6a but it contains additional blocks 404, 405 and 406 to compensate for a frequency error in the same way as in the arrangement depicted in FIG. 4.

The invention is not limited to processing an OFDM-modulated signal, but the principle according to the invention can also be applied in the processing of other signals in which a given signal part appears twice in unchanged form within a short period of time.

What is claimed is:

1. A method for achieving and maintaining symbol synchronization in a receiver, comprising steps in which a correlation (302) between an undelayed sample sequence representing a received signal and a delayed sample sequence representing a received signal is calculated, and a moving sum (306) is calculated of the calculated correlation to produce a sequence of values, characterized in that it comprises steps in which values in said value sequence are multiplied by predetermined other values (307, 502) obtained from said value sequence in order to produce a modified sequence of values, and a moving sum (311, 505) is calculated of the modified sequence of values in order to produce a peak value that indicates the correct symbol synchronization.

2. The method of claim 1, characterized in that multiplication of the values in said value sequence by other values obtained from said value sequence means calculation of correlation (307) between the undelayed value sequence and a delayed value sequence.

3. The method of claim 2, characterized in that the sample sequence representing the received signal comprises N+L samples per symbol, where N and L are positive integers, and the first L samples belonging to a given symbol represent, as regards contents, a similar received signal portion as the last L samples of the same symbol, so that when calculating the correlation (302) between an undelayed sample sequence representing the received signal and a delayed sample sequence representing the received signal, the length of the delay (303) of the delayed sample sequence is N samples, and when calculating the correlation (307) between an undelayed value sequence and a delayed value sequence, the length of the delay (308) of the delayed value sequence is N+L samples.

4. The method of claim 1, characterized in that the multiplication of values in said value sequence by other values obtained from said value sequence means multiplication (502) of the values in the value sequence by the highest value in the delayed value sequence.

5. The method of claim 4, characterized in that the sample sequence representing the received signal comprises N+L samples per symbol, and the first L samples of a given symbol represent, as regards contents, a similar received signal portion as the last L samples of the same symbol so that when calculating the correlation (302) between an undelayed sample sequence representing the received signal and a delayed sample sequence representing the received signal, the length of the delay of the delayed sample sequence is N samples, and when multiplying the values of said value sequence by the highest value of the delayed value sequence, the highest value is selected (503) from among the N+L values representing the symbol in question.

6. The method of claim 1, characterized in that a sample sequence representing the received signal comprises N+L samples per symbol, and the first L samples of a given symbol represent, as regards contents, a similar received signal portion as the last L samples of the same symbol so that the peak value produced on the basis of a moving sum of a modified value sequence is set so as to correspond to the $L/2^{th}$ sample of the symbol from the beginning.

7. The method of claim 1, characterized in that for symbol demodulation, samples detected by a given FFT window are taken from the sample sequence representing the symbol and a discrete Fourier transform (403) is carried out on those samples, and for compensation of frequency error caused by a non-ideal position of the FFT window with regard to the sample sequence the method comprises steps in which the position (404) of the FFT window used in the demodulation of the first symbol in a given frame is stored, from the stored position of the FFT window used in the demodulation of the first symbol it is subtracted (405) in conjunction with the demodulation of a given next symbol the position of the FFT window used in the demodulation of the symbol in question, and the values produced by fast Fourier transform on the samples representing the symbol in question are multiplied (406) by $e^{-i2\pi k\epsilon/N}$, where k is the index of the value produced by the Fourier transform, N is the number of values produced in the Fourier transform, and $\epsilon$ is the difference of the position of the FFT window used in the demodulation of the first symbol and the position of the FFT window used in connection with the demodulation of the symbol in question.

8. A receiver (600, 600') for receiving and demodulating a signal comprised of symbols, comprising:

means for generating (601, 602, 603) a sample sequence representing a received signal, means for calculating (302) a correlation between the undelayed sample sequence representing the received signal and a delayed sample sequence representing the received signal, and means for producing (306) a moving sum of the calculated correlation to generate a value sequence, characterized in that it also comprises:

means for multiplying (307, 502) the values of said value sequence by predetermined other values obtained from said value sequence to produce a modified value sequence, and means for producing (311, 505) a moving sum of the modified value sequence to produce a peak value that indicates the correct symbol synchronization.

9. The receiver of claim 8, characterized in that for multiplication of the values of said value sequence by other values obtained from said value sequence it comprises means for calculating (307) a correlation between the undelayed value sequence and a delayed value sequence.

10. The receiver of claim 9, characterized in that for demodulation of a received signal in which a sample sequence comprises N+L samples per symbol, where N and L are positive integers and the first L samples belonging to a given symbol represent, as regards contents, a similar received signal portion as the last L samples of the same symbol, the receiver comprises a delay element (303) of N samples to delay that delayed sample sequence which is used in the correlation calculation with the undelayed sample sequence representing the received signal, and a delay element (308) of N+L samples to delay that delayed value sequence which is used in the correlation calculation with the undelayed value sequence.

11. The receiver of claim 8, characterized in that for multiplication of the values of said value sequence by other values obtained from said value sequence it comprises means for finding (502) the highest value in the delayed value sequence and for multiplying the undelayed value sequence by the highest value found.

12. The receiver of claim 8, characterized in that for symbol demodulation it comprises means for taking samples detected by an FFT window from the sample sequence representing the symbol and for performing (403, 605) a Fourier transform on those samples, and to compensate for a frequency error caused by a non-ideal position of the FFT window with respect to the sample sequence it comprises:

means for storing (404) the position of the FFT window used in the demodulation of the first symbol of a given frame, means for subtracting (405) the position of the FFT window used in the demodulation of a certain next symbol from the stored position of the FFT window used in the demodulation of the first symbol, and means for multiplying (406) the values obtained by means of Fourier transform from the samples representing the next symbol in question by $e^{-i2\pi k\epsilon/N}$, where k is the index of the value produced by the Fourier transform, N is the number of values produced in the Fourier transform, and $\epsilon$ is the difference of the position of the FFT window used in the demodulation of the first symbol and the position of the FFT window used in connection with the demodulation of the symbol in question.

* * * * *

UNITED STATES PATENT AND TRADEMARK OFFICE
CERTIFICATE OF CORRECTION

PATENT NO.   : 6,421,401 B1
DATED        : July 16, 2002
INVENTOR(S)  : Arto Palin It is certified that error appears in the above-identified patent and that said Letters Patent is hereby corrected as shown below:

<u>Title page,</u>
Item [57], ABSTRACT,
Line 2, after "receiver" -- , -- should be inserted.

Signed and Sealed this

Eighteenth Day of February, 2003

JAMES E. ROGAN
*Director of the United States Patent and Trademark Office*